(12) United States Patent
Sekine et al.

(10) Patent No.: US 10,178,261 B2
(45) Date of Patent: Jan. 8, 2019

(54) SYSTEM AND IMAGE FORMING APPARATUS THAT STOPS OR CONTROLS THE TRANSMISSION OF CONTROL INFORMATION BETWEEN AT LEAST ONE CONTROLLED DEVICE AND AN EXTERNAL DEVICE

(71) Applicant: FUJI XEROX CO., LTD., Tokyo (JP)

(72) Inventors: Yoshihiro Sekine, Kanagawa (JP); Chigusa Nakata, Kanagawa (JP); Hiroshi Honda, Kanagawa (JP); Eiji Nishi, Kanagawa (JP); Kenji Kuroishi, Kanagawa (JP); Hiroshi Mikuriya, Kanagawa (JP); Takeshi Furuya, Kanagawa (JP); Ryuichi Ishizuka, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 116 days.

(21) Appl. No.: 15/482,058

(22) Filed: Apr. 7, 2017

(65) Prior Publication Data
US 2018/0020111 A1    Jan. 18, 2018

(30) Foreign Application Priority Data
Jul. 12, 2016    (JP) .................................. 2016-137963

(51) Int. Cl.
| H04W 88/16 | (2009.01) |
| H04N 1/00 | (2006.01) |
| H04N 1/32 | (2006.01) |

(52) U.S. Cl.
CPC ..... *H04N 1/00954* (2013.01); *H04N 1/00344* (2013.01); *H04N 1/32512* (2013.01); *H04N 2201/0013* (2013.01); *H04N 2201/0094* (2013.01)

(58) Field of Classification Search
None
See application file for complete search history.

(56) References Cited

U.S. PATENT DOCUMENTS

| 6,304,523 B1 | 10/2001 | Jones et al. |
| 2002/0048224 A1 | 4/2002 | Dygert et al. |
| 2014/0204833 A1 | 7/2014 | Negishi et al. |

(Continued)

FOREIGN PATENT DOCUMENTS

| JP | 2000-215653 A | 8/2000 |
| JP | 2005-506646 A | 3/2005 |
| JP | 2007-095306 A | 4/2007 |

(Continued)

*Primary Examiner* — Paul F Payer
(74) *Attorney, Agent, or Firm* — Sughrue Mion, PLLC

(57) ABSTRACT

A system includes at least one controlled device that is controlled based on control information output from an external device, and an image forming apparatus that forms an image on a recording material and communicate with the external device and the controlled device, wherein the image forming apparatus includes a transceiver that receives the control information from the external device and transmits the control information to the controlled device, and a transmission controller that stops the transmission of the control information by the transceiver or changes contents of the control information to be transmitted by the transceiver.

11 Claims, 4 Drawing Sheets

(56) References Cited

U.S. PATENT DOCUMENTS

2014/0365800 A1* 12/2014 Kuroishi .............. G06F 1/3293
　　　　　　　　　　　　　　　　　　　　　　713/323
2015/0094872 A1* 4/2015 Huang ................ H04L 12/2816
　　　　　　　　　　　　　　　　　　　　　　700/297

FOREIGN PATENT DOCUMENTS

| JP | 2014-127729 A | 7/2014 |
| JP | 2014-146123 A | 8/2014 |
| JP | 2015-119457 A | 6/2015 |
| JP | 2016-006922 A | 1/2016 |

* cited by examiner

SYSTEM AND IMAGE FORMING APPARATUS THAT STOPS OR CONTROLS THE TRANSMISSION OF CONTROL INFORMATION BETWEEN AT LEAST ONE CONTROLLED DEVICE AND AN EXTERNAL DEVICE

CROSS-REFERENCE TO RELATED APPLICATIONS

This application is based on and claims priority under 35 USC 119 from Japanese Patent Application No. 2016-137963 filed Jul. 12, 2016.

BACKGROUND

Technical Field

The present invention relates to a system and an image forming apparatus.

SUMMARY

According to an aspect of the invention, a system includes at least one controlled device that is controlled based on control information output from an external device, and an image forming apparatus that forms an image on a recording material and communicate with the external device and the controlled device, wherein
the image forming apparatus includes
a transceiver that receives the control information from the external device and transmits the control information to the controlled device, and
a transmission controller that stops the transmission of the control information by the transceiver or changes contents of the control information to be transmitted by the transceiver.

BRIEF DESCRIPTION OF THE DRAWINGS

Exemplary embodiments of the present invention will be described in detail based on the following figures, wherein.

DETAILED DESCRIPTION

Figure 1:
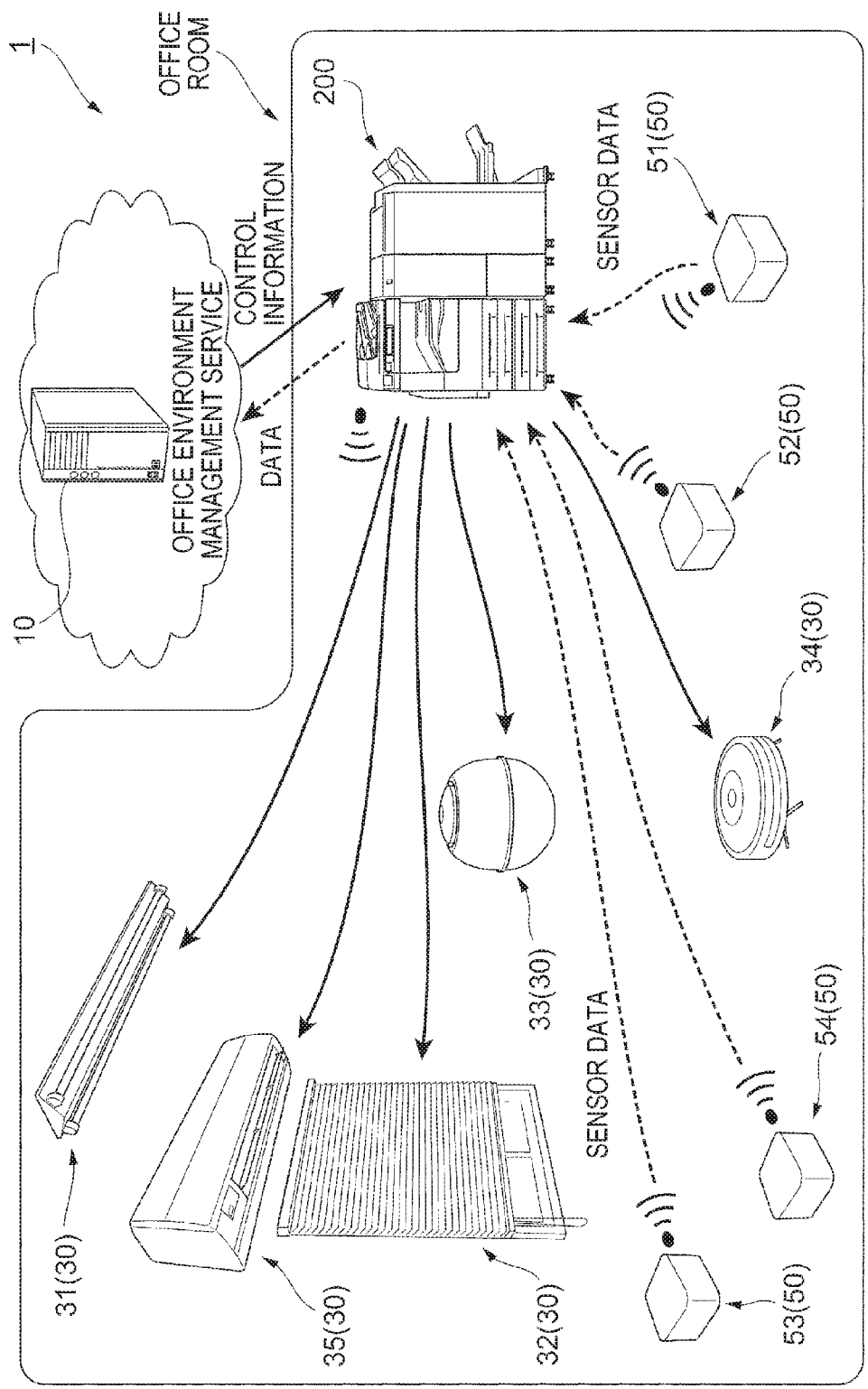
FIG. 1 is a view illustrating the overall configuration of an office environment management system.

Hereinafter, an exemplary embodiment of the present invention will be described in detail with reference to the accompanying drawings.
FIG. 1 is a view illustrating the overall configuration of an office environment management system 1.
The office environment management system 1 is provided with a management server 10 as an example of an external device provided on a cloud, and an image forming apparatus 200 connected to the management server 10 and functioning as a gateway or an edge server.
The image forming apparatus 200 is installed in an office room (in an office) where a user is working. Further, the image forming apparatus 200 has a FAX function and a scanner function in addition to the image forming function.

Figure 2:
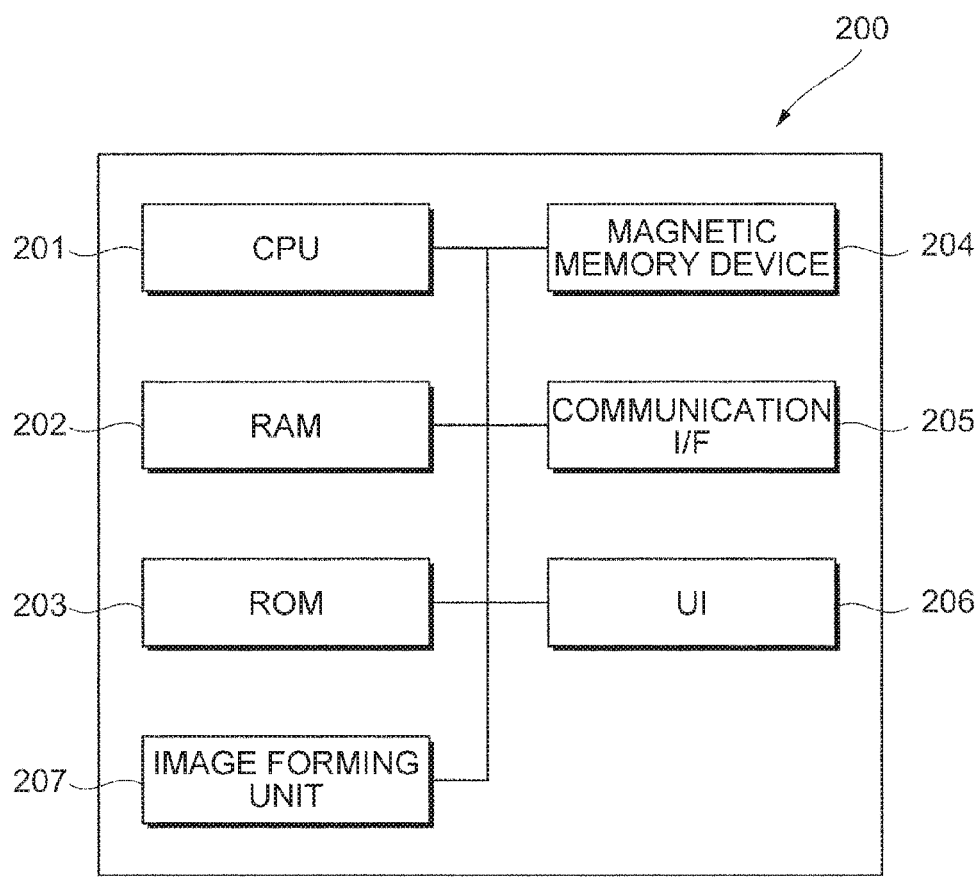
FIG. 2 is a view illustrating a hardware configuration of an image forming apparatus.

In addition, the office environment management system 1 is provided with plural controlled devices 30 connected to the management server 10 via the image forming apparatus 200 and controlled by the management server 10.
Further, the office environment management system 1 according to the exemplary embodiment is provided with plural situation grasping devices 50 installed in the office room and grasping the situations around them.
The controlled devices 30 communicate with the image forming apparatus 200 to receive a control signal from the image forming apparatus 200. In the exemplary embodiment, as the controlled device 30, for example, a lighting device 31, a window shade device 32, a humidifier 33, a cleaning device 34 and an air conditioner 35 are provided.
The lighting device 31 has a light source and turns on/off the light source according to the control signal from the management server 10.
The window shade device 32 has a window shade and a drive mechanism for changing the state of the window shade and changes the state of the window shade according to the control signal from the management server 10. Thereby, the amount of external light entering the office room is changed.
The humidifier 33 has a mechanism for evaporating water and humidifies the interior of the office room according to the control signal from the management server 10.
The cleaning device 34 has a suction mechanism for sucking dust in the office and is moved in the office room to collect dust in the office room according to the control signal from the management server 10.
The air conditioner 35 has a heating source or the like and controls air conditioning in the office according to the control signal from the management server 10.
Further, in the exemplary embodiment, various sensors are installed as the situation grasping devices 50.
Specifically, in the exemplary embodiment, a temperature sensor 51 for measuring temperature, a humidity sensor 52 for measuring humidity, and an illuminance sensor 53 for measuring illuminance are provided. In addition, a human sensor 54 configured with an infrared sensor or the like and configured to detect a person in the office room is provided.
In the exemplary embodiment, a case where the sensors are installed as the situation grasping devices 50 will be described as an example, but the situation grasping devices 50 may be monitoring cameras and other devices.
Each of the situation grasping devices 50 uses wireless communication or wired communication (i.e., communicates with the image forming apparatus 200) to transmit acquired information (hereinafter, referred to as "situation information") to the image forming apparatus 200. Then, the image forming apparatus 200 transmits the situation information from the situation grasping device 50 to the management server 10 (a server of a service company providing an office environment management service).
Furthermore, in the office environment management system 1, control information used to control the controlled device 30 is transmitted from the management server 10 to the image forming apparatus 200. Then, the image forming apparatus 200 transmits the control information to the corresponding controlled device 30.
FIG. 2 is a view illustrating a hardware configuration of the image forming apparatus 200.
As illustrated in FIG. 2, the image forming apparatus 200 includes a central processing unit (CPU) 201, a random access memory (RAM) 202, a read only memory (ROM) 203 and a magnetic memory device 204. Further, the image forming apparatus 200 includes a communication interface (communication I/F) 205 for communicating with the outside.

Further, the image forming apparatus 200 includes a UI 206 and an image forming unit 207.

The UI 206 is constituted with, for example, a touch panel display, displays information to a user, and receives an operation from the user.

The image forming unit 207 as an example of an image forming unit uses an electrophotographic method, an inkjet head method or the like to form an image on a sheet which is an example of a recording material.

The ROM 203 and the magnetic memory device 204 store programs to be executed by the CPU 201. The CPU 201 reads a program stored in the ROM 203 or the magnetic memory device 204 and executes the program with the RAM 202 as a work area.

When the programs stored in the ROM 203 and the magnetic memory device 204 are executed by the CPU 201, functional units to be described later are realized.

Here, the programs to be executed by the CPU 201 may be provided to the image forming apparatus 200 in such a form that the programs are stored in a computer-readable recording medium such as a magnetic recording medium (a magnetic tape, a magnetic disk or the like), an optical recording medium (an optical disc or the like), a magneto-optical recording medium, a semiconductor memory, or the like. Further, the programs to be executed by the CPU 201 may be downloaded to the image forming apparatus 200 via a communication unit such as the Internet.

Figure 3:
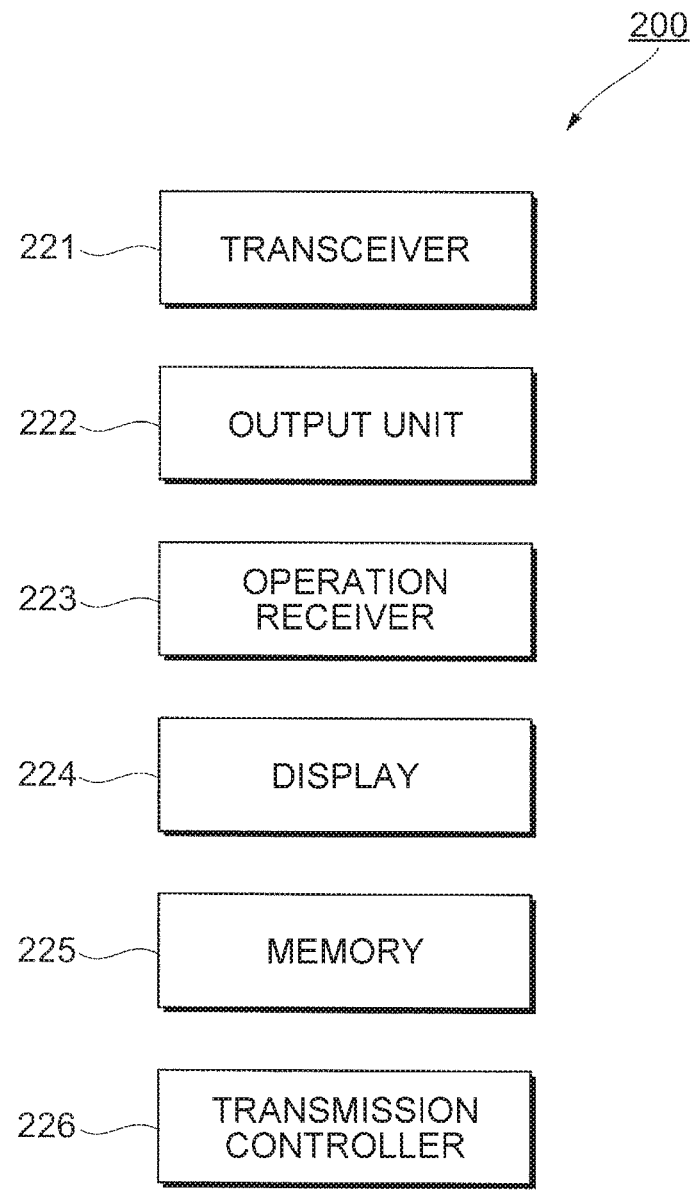
FIG. 3 is a view illustrating functional units realized by a CPU or the like of the image forming apparatus.

FIG. 3 is a view illustrating functional units realized by the CPU 201 or the like provided in the image forming apparatus 200.

As illustrated in FIG. 3, the image forming apparatus 200 according to the exemplary embodiment is provided with a transceiver 221 as an example of a transceiver, a transmitter, and an acquiring unit. The transceiver 221 is implemented by the CPU 201 that executes a program related to transmission/reception of information and the communication I/F 205.

The transceiver 221 receives the control information from the management server 10. The received control information is transmitted to the controlled devices 30. In addition, the transceiver 221 receives (acquires) the information from the controlled devices 30. Further, the transceiver 221 transmits the information from the controlled devices 30 to the management server 10.

Furthermore, the transceiver 221 receives (acquires) information (information including the situation information) output from the situation grasping devices 50. Furthermore, the transceiver 221 transmits the information received from the situation grasping devices 50 to the management server 10.

Further, as illustrated in FIG. 3, the image forming apparatus 200 includes an output unit 222.

The output unit 222 as an example of an output unit is implemented by the CPU 201 that executes a program related to an output.

The output unit 222 outputs information of the controlled devices 30, which is acquired by the transceiver 221, or information of the situation grasping devices 50, which is acquired by the transceiver 221. Further, in addition to the information of the controlled devices 30 and the situation grasping devices 50, the output unit 222 outputs information of the management server 10.

More specifically, the output unit 222 displays the information on a display 224 (which will be described later), prints out the information on a sheet using the image forming unit 207 (see FIG. 2), or sends the information via an e-mail.

Further, the image forming apparatus 200 includes an operation receiver 223, a display 224 and a memory 225.

The operation receiver 223 is implemented by, for example, the CPU 201 (see FIG. 2) that executes a program related to operation reception, and the UI 206. The operation receiver 223 receives information input by a user in the office room.

The display 224 is configured with the UI 206 (see FIG. 2) and displays information to the user in the office room.

The memory 225 is configured with the magnetic memory device 204 (see FIG. 2) or the like and stores information.

Further, as illustrated in FIG. 3, the image forming apparatus 200 includes a transmission controller 226 as an example of a transmission controller.

The transmission controller 226 stops transmission of information to the controlled device 30 by the transceiver 221 or changes the contents of the information transmitted by the transceiver 221.

More specifically, based on an instruction received by the operation receiver 223 from the user, the transmission controller 226 stops the transmission of the information to the controlled device 30 or changes the contents of the information transmitted to the controlled device 30.

In addition, upon receiving a collective stop instruction or a collective change instruction from the user, the transmission controller 226 collectively performs the stop of transmission of information and the change of contents of information for the plural controlled devices 30.

Further, the transmission controller 226 stops the transmission of information to the management server 10 by the transceiver 221 or changes the contents of the information to be transmitted.

More specifically, the transmission controller 226 stops the transmission of the information acquired by the situation grasping device 50 to the management server 10 or changes the contents of the information to be transmitted.

Even in this case as well, based on an instruction received by the operation receiver 223 from the user, the transmission controller 226 stops the transmission of the information or changes the contents of the information.

In addition, based on an instruction from the user, the transmission controller 226 collectively performs stop of transmission of information or change of contents of information, for the plural situation grasping devices 50.

The image forming apparatus 200 of the exemplary embodiment monitors information (information including the control information) transmitted from the management server 10 to the controlled device 30.

Further, in the exemplary embodiment, when the initial setting of the situation grasping device 50 and the controlled device 30 is completed (when the initial setting of the situation grasping device 50 and the controlled device 30 for the office environment management system 1 is completed), the output unit 222 of the image forming apparatus 200 outputs the operation situations of the situation grasping device 50, the controlled device 30 and the management server 10.

More specifically, the output unit 222 displays the operation information of these devices on the display 224, prints the information on a sheet, or transmits the information by an e-mail.

In addition, in the exemplary embodiment, without being limited to when the initial setting is completed, even when the operation receiver 223 of the image forming apparatus 200 receives an instruction from the user, similarly, the output unit 222 outputs the operation situations of the situation grasping device 50, the controlled device 30 and the management server 10.

Furthermore, in the exemplary embodiment, not only when the initial setting is made but also when any one of the controlled devices 30 or any one of the situation grasping devices 50 is removed from the office environment management system 1 (when registration in the office environment management system 1 is released), the output unit 222 outputs information indicating that the controlled device 30 or the situation grasping device 50 has been removed.

Furthermore, the display 224 of the image forming apparatus 200 displays a controlled device 30 and a situation grasping device 50 related to services provided by the management server 10 for each of the services.

Although a case where one service related to the office's environmental management is provided via the image forming apparatus 200 is exemplified in FIG. 1, there may be a case where plural kinds of services are provided via the image forming apparatus 200.

In this case, in the exemplary embodiment, the display 224 displays the controlled device 30 and the situation grasping device 50 related to the services for each of the services. In other words, the display 224 displays each service in association with each of the controlled devices 30 and each of the situation grasping devices 50.

Furthermore, in the exemplary embodiment, the transceiver 221 functioning as the acquiring unit acquires information of the controlled devices 30 and information of the situation grasping devices 50.

More specifically, the transceiver 221 acquires, for example, information of the operation situations of the controlled devices 30 and the situation grasping devices 50. In addition, the transceiver 221 acquires information of consumables for each of the controlled devices 30 and each of the situation grasping devices 50, for example. In addition, the transceiver 221 acquires information of a battery (information of a power supply) or the like for each of the controlled devices 30 and each of the situation grasping devices 50.

In the exemplary embodiment, when the transceiver 221 acquires these pieces of information, the output unit 222 outputs these pieces of information.

Specifically, similarly to the above, the output unit 222 displays the information on the operation receiver 223 or prints it on a sheet, for example. Further, the output unit 222 transmits the information to, for example, the management server 10, or transmits the information to an administrator or the like via an e-mail.

Here, in many cases, the controlled device 30 and the situation grasping device 50 (in particular, the situation grasping device 50) may not be provided with a display. In these cases, it is difficult to know setting situations and operation situations for the controlled devices 30 and the situation grasping devices 50.

In addition, in a case where plural kinds of services are provided, if a display is not provided, it is difficult to know any service under which each of the controlled devices 30 and each of the situation grasping devices 50 are being operated. Furthermore, it is difficult to know the situations of consumables and batteries or the like in the controlled device 30 and the situation grasping device 50.

In contrast, in the exemplary embodiment, the information of the controlled device 30 and the situation grasping device 50 is acquired by the image forming apparatus 200 and is output from the image forming apparatus 200. Thus, the user may more clearly grasp the information of the controlled device 30 and the situation grasping device 50. In particular, the image forming apparatus 200 is normally installed in an office room, and the user may grasp the information of the controlled device 30 and the situation grasping device 50 without going to a special place.

In the exemplary embodiment, the transmission controller 226 stops the transmission of the control information transmitted to the controlled device 30 or changes the contents of the control information transmitted to the controlled device 30.

More specifically, for example, in response to an instruction from the user, the transmission controller 226 transmits, to the transceiver 221, a signal indicating that the transmission of the control information should be stopped. Then, in this case, the transceiver 221 that has received this signal stops the transmission of the control information to the controlled device 30.

Further, in response to an instruction from the user, the transmission controller 226 transmits, to the transceiver 221, a signal indicating that the contents of the control information should be changed.

Then, in this case, the transceiver 221 transmits, to the controlled device 30, control information different in contents from the control information that has been transmitted so far. Then, in this case, the controlled device 30 performs an operation different from that performed so far.

Here, the stop of the transmission of the control information to the controlled device 30 and the change of the contents of the control information may be not only performed for each service but also may be performed only for a specific controlled device 30 among the plural controlled devices 30 included in one service.

In the exemplary embodiment, a collective stop/restart button is displayed on the operation receiver 223, whereby, it is easy to stop the operation of the controlled device 30, which may possibly be done at the time of emergency stop at the time of a disaster, start of a maintenance check and start of a vacation period.

More specifically, in the exemplary embodiment, when the user performs an operation on the collective stop/restart button, in response to a collective stop instruction from the user, the transmission controller 226 outputs a control signal for collective stop to the transceiver 221, and the transceiver 221 stops the transmission of the control information to each of the plural controlled devices 30 or changes the contents of the control information to be transmitted. Thereby, the plural controlled devices 30 stop their operations or are operated in another mode such as a power saving mode.

Further, in the exemplary embodiment, when an error occurs in the transmission of information from the management server 10 to the controlled device 30, or when the communication between the management server 10 and the image forming apparatus 200 is disconnected, the output unit 222 of the image forming apparatus 200 prints the operation situation report or transmits an e-mail to the administrator or the like.

Further, in the exemplary embodiment, a button "maintenance start" is displayed on the operation receiver 223. When this button is pressed by the user, the image forming apparatus 200 of the exemplary embodiment does not transmit an error to the management server 10 until the maintenance is ended (i.e., until the user inputs information indicating that the maintenance has ended).

Here, when the maintenance of the controlled device 30 is started, an error may be output from the controlled device 30. However, in the exemplary embodiment, even in this case, an error is not transmitted to the management server 10 and the maintenance of the controlled device 30 may be continuously performed.

In the exemplary embodiment, in response to an instruction from the user, the transmission controller 226 stops the transmission of the information output from the situation grasping device 50 to the management server 10.

Here, for example, the maintenance of the situation grasping device 50 may be performed, in which case, a transmission stop instruction is issued from the user via the operation receiver 223.

In this case, the transmission controller 226 transmits, to the transceiver 221, a control signal indicating that the transmission is stopped. Accordingly, the transceiver 221 stops the transmission of the information to the management server 10 (stops the transmission of the information output from the situation grasping device 50, to the management server 10).

As another operation, in the exemplary embodiment, in response to an instruction from the user, the transmission controller 226 outputs, to the transceiver 221, a signal indicating that the output information is changed. In response to this signal, the transceiver 221 changes the contents of the information to be transmitted to the management server 10. In other words, the transceiver 221 does not directly transmit the information from the situation grasping device 50 to the management server 10 but transmits information different in contents from the above mentioned information to the management server 10.

Specifically, for example, the transceiver 221 transmits information for not causing an error in the management server 10, instead of the information itself output from the situation grasping device 50, to the management server 10.

More specifically, there is a case where the situation grasping device 50 is switched to another situation grasping device 50 by exchange of the situation grasping device 50. In this case, when information output from another situation grasping device 50 is transmitted to the management server 10, an error may occur in the management server 10. More specifically, in this case, when a signal from a situation grasping device 50 which has not been detected so far is input to the management server 10, an error may occur in the management server 10.

In order to prevent this, in the exemplary embodiment, when the situation grasping device 50 is switched to another situation grasping device 50, the transceiver 221 transmits, to the management server 10, information for not causing an error in the management server 10, in addition to the information output from the another situation grasping device 50.

More specifically, for example, the transceiver 221 transmits identification information of the situation grasping device 50 before being switched, together with the information output from the another situation grasping device 50 after being switched. In this case, the management server 10 recognizes that information has been transmitted from the situation grasping device 50 before being switched, thereby preventing an occurrence of an error.

More specifically, when the situation grasping device 50 is exchanged for a new situation grasping device 50, the user operates the operation receiver 223 of the image forming apparatus 200 or a separately provided Web UI or the like to input a fact that the situation grasping device 50 has switched to the new situation grasping device 50.

In this case, the transmission controller 226 instructs the transceiver 221 to change the information to be transmitted to the management server 10.

In response to this instruction, the transceiver 221 transmits information acquired by the new situation grasping device 50, as the information acquired by the old situation grasping device 50, to the management server 10. More specifically, the transceiver 221 transmits, to the management server 10, the identification information of the old situation grasping device 50, together with the information acquired by the new situation grasping device 50. As a result, no error occurs in the management server 10, and the information grasped by the new situation grasping device 50 is registered in the management server 10.

In changing the contents of the control information to be transmitted to the controlled device 30 or stopping the transmission of the control information, when operating the management server 10 to perform the changing or stopping takes more time than operating a nearby device to perform the changing or stopping.

In contrast, in the exemplary embodiment, the image forming apparatus 200 that is generally present in the office is operated to change the control information and stop the transmission of the control information. In other words, in the exemplary embodiment, a nearby device is operated to change the control information and stop the transmission of the control information. Thus, in the exemplary embodiment, it is possible to more easily change the contents of control and stop the transmission of the control information.

Further, as in the exemplary embodiment, in the configuration in which the information from the situation grasping device 50 is input to the management server 10, in order to change the information to be input to the management server 10 or stop the input of the information to the management server 10, for example, it is conceivable to directly operate each of the situation grasping devices 50 to change the information output from the situation grasping device 50 or stop the output of the information from the situation grasping device 50.

However, in some cases, the situation grasping device 50 such as a sensor may be installed on a ceiling or the like, which may make it difficult to directly operate the situation grasping device 50.

In contrast, in the exemplary embodiment, a nearby image forming apparatus 200 is operated to change the information to be input to the management server 10 or stop the input of the information to the management server 10.

This makes it possible to more easily change the information to be input to the management server 10 and stop the input of the information to the management server 10, as described above.

Figure 4:
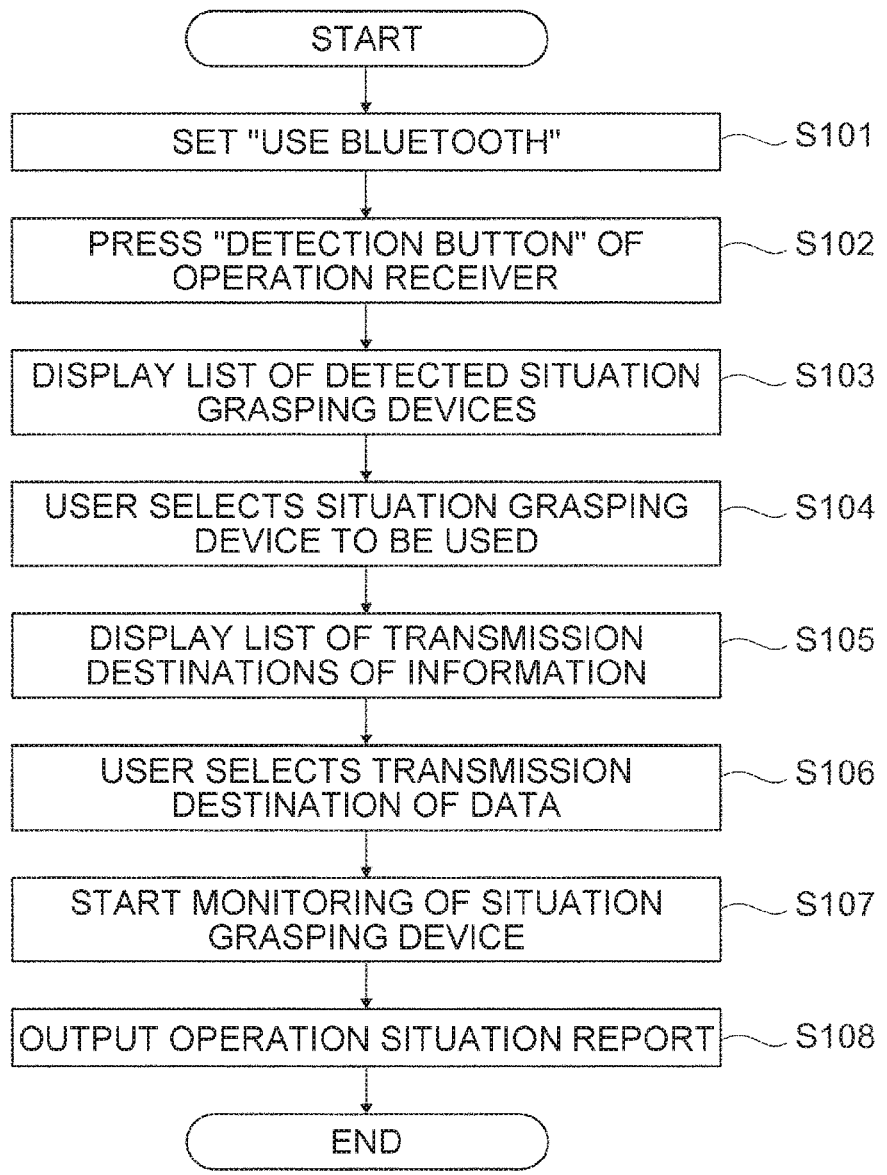
FIG. 4 is a diagram illustrating a detailed operation example of the office environment management system.

FIG. 4 is a diagram illustrating a detailed operation example of the office environment management system 1. Specifically, FIG. 4 is a flowchart illustrating a flow of a process performed when a situation grasping device 50 is registered in the image forming apparatus 200 using Bluetooth®.

In the registration of the situation grasping device 50, the user first accesses the operation receiver 223 of the image forming apparatus 200 or a Web UI (not illustrated) and sets "use Bluetooth" (step 101) to activate a service using the Bluetooth.

Next, the user presses a "detection button" displayed on the operation receiver 223 (step 102) in order to detect the situation grasping device 50 which performs communication by Bluetooth.

Thereby, situation grasping devices 50 (the situation grasping devices 50 in the office room) that perform communication by Bluetooth are detected, and furthermore, a list of detected situation grasping devices 50 (situation grasping devices 50 capable of conducting communication by Bluetooth) is displayed on the operation receiver 223 (step 103).

In addition, identification numbers and addresses of the detected situation grasping devices 50 are displayed on the operation receiver 223. At this time, only the identification numbers and addresses of the newly detected situation grasping devices 50 are displayed on the operation receiver 223, and the identification numbers and addresses of the situation grasping devices 50 already connected to the image forming apparatus 200 and the management server 10 are not displayed.

Next, the user selects a situation grasping device 50 to be used from the list of situation grasping devices 50 displayed on the operation receiver 223 (step 104) and presses a "save" button displayed on the operation receiver 223. Thus, the selected situation grasping device 50 is registered, as a situation grasping device 50 for transmitting information to the management server 10, in the image forming apparatus 200 and the management server 10. In addition, at the time of registration, the name, installation location and the like of the situation grasping device 50 are also registered.

Furthermore, when the user operates the operation receiver 223, a list of transmission destinations of information (a list of the management server 10) is displayed on the operation receiver 223 (step 105).

Then, the user selects a transmission destination of data acquired by the newly registered situation grasping device 50 from this list (step 106). In the exemplary embodiment, when there is no transmission destination, the operation receiver 223 may be operated to add a new transmission destination.

Here, plural data transmission destinations may be selected, and information obtained by one situation grasping device 50 may be transmitted to plural transmission destinations.

In the exemplary embodiment, selection buttons such as "Send data of all the situation grasping devices 50" and "Release all" may be also displayed on the operation receiver 223 to perform collective transmission and collective stop of information obtained by plural situation grasping devices 50.

Thereafter, the image forming apparatus 200 monitors whether or not the information acquired by the newly registered situation grasping device 50 has been transmitted to the management server 10 (whether or not the situation grasping device 50 has started to function properly) (step 107).

Then, when the information is transmitted to the management server 10, the output unit 222 outputs an operation situation report (step 108). More specifically, for example, the image forming unit 207 (see FIG. 2) is operated to print information of the operation situation of the situation grasping device 50 on a sheet (i.e., print the effect that the operation is properly started).

At this time, without being limited to the generation of the report, for example, the operation situations may be e-mailed to a registered e-mail address.

The process performed when a situation grasping device 50 is newly installed has been described above. In the exemplary embodiment, however, the operation receiver 223 may be operated to output the operation situation report at a timing desired by the user.

Here, a list of situation grasping devices 50 and the correspondence relationship between each of the situation grasping devices 50 and each service are also displayed on the operation situation report. Additionally, information as to which service each situation grasping device 50 is operating under is also displayed.

Information of the consumables of each situation grasping device 50 may also be included in the output of the operation situation report. Here, the information of the consumables is acquired by each situation grasping device 50 and transmitted from each situation grasping device 50 to the image forming apparatus 200 and the management server 10.

In the exemplary embodiment, the state of each of the situation grasping devices 50 is stored in the memory 225 (see FIG. 3) of the image forming apparatus 200.

Specifically, any ones of the states of "unregistered", "transmission destination not set", "not transmitted", "being collected", "being transmitted", "being stopped" and "deleted" are stored, as the states of the situation grasping device 50, in the memory 225 of the image forming apparatus 200.

As used herein, the "unregistered" refers to that a situation grasping device 50 is not registered in the image forming apparatus 200. The "transmission destination not set" refers to a state in which a transmission destination is not linked to the situation grasping device 50. The "not transmitted" refers to a state in which information acquired by the situation grasping device 50 has never been transmitted to the management server 10.

The "being collected" refers to a state in which information has reached the image forming apparatus 200 although the information is not being transmitted to the management server 10. The "being transmitted" refers to a state in which transmission of information to the management server 10 is started. The "being stopped" refers to a state in which transmission of information to the management server 10 is stopped. The "deleted" refers to a state in which registration of the situation grasping device 50 in the image forming apparatus 200 is released.

Information of each service is also stored in the memory 225 of the image forming apparatus 200. Specifically, as a state of each service, one of the states of "received, "being operated" and "being stopped" is stored.

As used herein, the "received" refers to a state in which a control signal is received by the image forming apparatus 200 from the management server 10 but control information is not transmitted to a controlled device 30. The "being operated" refers to a state in which control information from the management server 10 is being transmitted to the controlled device 30. The "being stopped" refers to a state in which transmission of control information from the management server 10 to the controlled device 30 is being stopped.

A specific operation example of the office environment management system 1 illustrated in FIG. 1 will now be described.

Here, for example, it is assumed that the temperature of the office room rises.

In this case, first, the temperature sensor 51 transmits temperature data indicating that the temperature has risen by one degree to the image forming apparatus 200. Then, the image forming apparatus 200 transmits the temperature data to the management server 10. Upon receiving the temperature data, the management server 10 detects that the temperature in the office room has risen and transmits a control signal for changing the state of a window shade to the image forming apparatus 200.

Then, the image forming apparatus 200 receives the control signal from the management server 10 and transmits the control signal to the window shade device 32. This causes the window shade device 32 to change the state of the window shade.

Thereafter, the illuminance sensor 53 transmits acquired illuminance data to the image forming apparatus 200, and the image forming apparatus 200 transmits the illuminance data to the management server 10.

Then, based on the illuminance data transmitted from the image forming apparatus 200, the management server 10 determines whether or not the state of the window shade has changed as instructed. In addition, the management server 10 monitors the information transmitted from the temperature sensor 51 via the image forming apparatus 200 to monitor whether or not the temperature in the office room lowers.

Another operation example will be described below.

In the office environment management system 1 illustrated in FIG. 1, results of detection by the illuminance sensor 53 and the human sensor 54 are transmitted to the management server 10 via the image forming apparatus 200.

In this case, based on the detection results from the illuminance sensor 53 and the human sensor 54, the management server 10 detects whether or not the office room is lit off and whether or not a person is present in the office room.

Then, when the office room is lit off and no person is present in the office room, the management server 10 transmits a control signal indicating that cleaning should be started to the cleaning device 34 via the image forming apparatus 200. Then, in this case, the cleaning device 34 performs cleaning in the office room.

In addition, in the exemplary embodiment, the user may operate the operation receiver 223 (see FIG. 3) to thereby stop the transmission of the information to the management server 10 or stop the transmission of the control information to the controlled device 30.

This makes it possible to increase safety during maintenance and inspection, prevent detection of an abnormal value, and prevent malfunction of the controlled device 30. In addition, it is possible to prevent wasteful electric consumption.

Here, there may be a case where an old situation grasping device 50 is changed to a new situation grasping device 50. In addition, there may be a case where the maintenance of the controlled device 30 is performed, such as replacing a light source of the lighting device 31, replacing a filter of the air conditioner 35, cleaning a nozzle of the humidifier 33, or the like. Furthermore, when there is a long break such as summer vacation, there may be situations where no person is present in the office room.

In such a case, in the exemplary embodiment, the operation receiver 223 is operated by the user to stop the transmission of information to the management server 10 and stop the transmission of control information to the controlled device 30.

Accordingly, the controlled device 30 does not operate, thereby enhancing safety during maintenance and inspection of the controlled device 30. In addition, information from the situation grasping device 50 is not input to the management server 10, thereby preventing an abnormal value from being detected in the management server 10. Further, when the transmission of the control information to the controlled device 30 is stopped, for example, the controlled device 30 is in a stopped state, thereby preventing wasteful electric consumption.

The case where the transmission of information to the management server 10 is stopped or the transmission of the control information to the controlled device 30 is stopped has been described here.

However, this case is only an example and the image forming apparatus 200 may change the contents of the information to be transmitted to the management server 10 or change the contents of the control information to be transmitted to the controlled device 30 and may transmit the changed information to the management server 10 or the controlled device 30.

For example, when the operation receiver 223 is operated by the user to set a low power consumption mode, the contents of the control information may be changed and a control signal for causing the controlled device 30 to be operated in the low power consumption mode may be transmitted from the image forming apparatus 200 to each of the controlled devices 30.

Further, for example, when the operation receiver 223 is operated by the user to set a maintenance/inspection mode, instead of the information itself obtained by the situation grasping device 50, information indicating that the maintenance and inspection is being performed may be added and transmitted from the image forming apparatus 200 to the management server 10.

Furthermore, in the exemplary embodiment, as described above, it is possible to perform a collective stopping process and the like. When the user performs the collective information transmission stopping process and the like through the operation receiver 223, it is possible to stop the transmission of information of the plural situation grasping devices 50 to the management server 10 or change the contents of the information to be transmitted. In addition, it is possible to stop the transmission of control information to the plural controlled devices 30 or change the contents of the information to be transmitted.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A system comprising:
  at least one controlled device that is controlled based on control information output from an external device; and
  an image forming apparatus that forms an image on a recording material and communicate with the external device and the controlled device, wherein
  the image forming apparatus includes
    a transceiver that receives the control information from the external device and transmits the control information to the controlled device, and
    a transmission controller that stops the transmission of the control information by the transceiver or changes contents of the control information to be transmitted by the transceiver.

2. The system according to claim 1, wherein based on an instruction from a user, the transmission controller of the image forming apparatus stops the transmission of the control information or changes the contents of the control information.

3. The system according to claim 1, wherein
the at least one controlled device includes a plurality of controlled devices,
the external device controls the plurality of controlled devices, and
the transmission controller of the image forming apparatus collectively performs the stop of the transmission of the control information or the change of the contents of the control information, for the plurality of controlled devices.

4. The system according to any one of claim 1, wherein the image forming apparatus further includes
an acquiring unit that acquires information of the controlled device; and
an output unit that outputs the information of the controlled device acquired by the acquiring unit.

5. The system according to claim 1, wherein the image forming apparatus further includes an output unit that outputs information of the external device that controls the controlled device.

6. The system according to claim 1, wherein the image forming apparatus further includes a transmitter that transmits information of the controlled device to the external device.

7. A system comprising:
at least one situation grasping device that grasps surrounding situations; and
an image forming apparatus that forms an image on a recording material and communicate with the situation grasping device, wherein
the image forming apparatus includes
a transmitter that transmits, to an external device, information output from the situation grasping device, and
a transmission controller that stops the transmission of the information by the transmitter or changes contents of the information to be transmitted by the transmitter.

8. The system according to claim 7, wherein the image forming apparatus further includes an output unit that outputs information of the situation grasping device.

9. The system according to claim 7, wherein
the at least one situation grasping device includes a plurality of situation grasping devices,
the transmitter of the image forming apparatus transmits, to the external device, information output from each of the plurality of the situation grasping devices, and
the transmission controller of the image forming apparatus collectively performs the stop of the transmission of the information or the change of the contents of the information, for the plurality of situation grasping devices.

10. The system according to claim 7, wherein when the situation grasping device is switched to another situation grasping device, the transmitter transmits, to the external device, information for not causing an error in the external device due to the switching.

11. An image forming apparatus comprising:
an image forming unit that forms an image on a recording material;
a transceiver that receives control information output from an external device and transmits the control information to a controlled device; and
a transmission controller that stops the transmission of the control information by the transceiver or changes contents of the control information to be transmitted by the transceiver.

* * * * *